US009296386B2

(12) United States Patent
Kobayashi et al.

(10) Patent No.: US 9,296,386 B2
(45) Date of Patent: Mar. 29, 2016

(54) VEHICLE CONTROL APPARATUS

(75) Inventors: Nobufusa Kobayashi, Anjo (JP); Toshio Sugimura, Nagoya (JP); Masato Yoshikawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/362,804

(22) PCT Filed: Dec. 12, 2011

(86) PCT No.: PCT/JP2011/006932

§ 371 (c)(1), (2), (4) Date: Jun. 4, 2014

(87) PCT Pub. No.: WO2013/088467

PCT Pub. Date: Jun. 20, 2013

(65) Prior Publication Data

US 2014/0302964 A1 Oct. 9, 2014

(51) Int. Cl.

*B60W 20/00* (2006.01)
*B60W 10/26* (2006.01)
*B60W 10/02* (2006.01)
*B60W 10/08* (2006.01)
*F16H 61/14* (2006.01)
*B60K 6/48* (2007.10)

(52) U.S. Cl.

CPC ................ *B60W 20/106* (2013.01); *B60K 6/48* (2013.01); *B60W 10/023* (2013.01); *B60W 10/026* (2013.01); *B60W 10/08* (2013.01); *B60W 10/26* (2013.01); *B60W 20/13* (2016.01); *F16H 61/143* (2013.01); *B60W 2510/244* (2013.01); *Y02T 10/6221* (2013.01); *Y10S 903/93* (2013.01); *Y10T 477/26* (2015.01)

(58) Field of Classification Search

None

See application file for complete search history.

(56) References Cited

U.S. PATENT DOCUMENTS

| | | | | |
|---|---|---|---|---|
| 6,183,389 | B1 * | 2/2001 | Tabata | 477/5 |
| 8,534,399 | B2 * | 9/2013 | Soliman et al. | 180/65.21 |
| 8,544,577 | B2 * | 10/2013 | Kitano et al. | 180/65.285 |
| 2004/0149502 | A1 * | 8/2004 | Itoh et al. | 180/65.2 |
| 2012/0290163 | A1 | 11/2012 | Inagaki et al. | |

FOREIGN PATENT DOCUMENTS

| | | | |
|---|---|---|---|
| JP | A-9-9414 | | 1/1997 |
| JP | 2000-134713 | A | 5/2000 |
| JP | 2000-220734 | A | 8/2000 |
| JP | A-2005-24049 | | 1/2005 |
| JP | A-2007-178000 | | 7/2007 |
| WO | 2011/122533 | A1 | 10/2011 |

* cited by examiner

*Primary Examiner* — Justin Holmes
*Assistant Examiner* — Timothy M Hannon
(74) *Attorney, Agent, or Firm* — Oliff PLC

(57) ABSTRACT

A vehicle control apparatus for a hybrid vehicle mounting a torque converter with a lock-up clutch in order to better accomplish good drivability as well as good gasoline mileage than conventional vehicle control apparatuses includes an engine, a motor generator, a torque convertor with the lock-up clutch, and a battery, and expands a lock-up region when the battery is not under a input/output limited state wider than when the battery is under the input/output limited state while the vehicle is being driven at least by the engine.

9 Claims, 8 Drawing Sheets

VEHICLE CONTROL APPARATUS

TECHNICAL FIELD

The present invention relates to a vehicle control apparatus.

BACKGROUND ART

In recent years, a hybrid vehicle is focused on as one type of vehicle of environment-friendly automobiles. The hybrid vehicle generally provides an internal combustion engine (hereinafter simply referred to as engine) powered by fuel such as gasoline or the like, and an electric motor (hereinafter simply referred to as motor) powered by electric power from a battery.

There is already developed an above mentioned type of a hybrid vehicle having mounted thereon a vehicle control apparatus comprising, for example, an engine, a motor, a torque converter and an automatic transmission mechanism connected in series, additionally provided with the battery and a control unit (for example, refer to Patent Document 1).

The torque converter is a fluid-type converter using circulating hydraulic oil, and is adapted to transmit output torque of the motor to the automatic transmission mechanism. The torque converter is adapted to amplify a torque inputted thereto and output the amplified torque by operation of the circulating hydraulic oil. Further, the torque converter is provided with a lock-up clutch for connecting and disconnecting between the motor and the automatic transmission mechanism.

The lock-up clutch is adapted to disconnect the automatic transmission mechanism from the motor, when the engine or the motor is over-loaded while the vehicle is running, with the result that the torque converter starts slipping to amplify the output of the engine or the motor.

On the other hand, the lock-up clutch is adapted to lock up the motor and the automatic transmission mechanism by connecting each other, when the engine or the motor is slightly loaded, with the result that the torque converter stops slipping, thereby improving transmitting efficiency of the driving force transmission system and gasoline mileage of the vehicle.

The control unit determines whether or not a crossing point of a vehicle speed and an accelerator opening degree at each moment is within a region in which the lock-up clutch should be connected (hereinafter referred to as lock-up region) in a vehicle-speed-accelerator-opening-degree map, by referencing the preliminarily set vehicle-speed-accelerator-opening-degree map. When the control unit determines that the crossing point of a vehicle speed and an accelerator opening degree at each moment exists in the lock-up region, the control unit connects the lock-up clutch.

The battery is adapted to charge electric power generated by the motor or to discharge electric power for driving the motor in accordance with operating condition of the vehicle. The control unit is adapted to calculate a residual electrical quantity of the battery (hereinafter referred to as SOC (state of charge)) based on an accumulating value of charge current and discharge current of the battery.

The control unit is adapted to expand the lock-up region of the vehicle-speed-accelerator-opening-degree map, when the SOC of the battery is large and the motor can generate large driving force. Thus, the control unit is adapted to raise a frequency of the lock-up clutch being connected in the torque converter, thereby improving transmitting efficiency of the driving force transmitting system and gasoline mileage of the vehicle. Additionally, the control unit is adapted to limit input/output of the battery and use of the motor, in order to protect the battery, when SOC of the battery is excessively large.

CITATION LIST

Patent Literature

Patent Document 1: Japanese Patent Application Publication No. 2005-24049

SUMMARY OF INVENSION

Technical Problem

However, the control unit applied for the conventional vehicle control apparatus limits use of the motor to protect the battery and expands the lock-up region of the map to improve gasoline mileage, when SOC is excessively large. Therefore, the conventional vehicle control apparatus may have a possibility to have the lock-up clutch connected when the use of the motor is limited.

When the lock-up clutch is connected during operation when the use of the motor is limited, there is a possibility that the lock-up clutch is connected even when the engine rotational speed is low. When the lock-up clutch is connected during the engine rotational speed being low, a torque fluctuation of the engine caused by cyclic cylinder igniting of the engine and cyclic reciprocating of the piston is transmitted to an input shaft of a transmission without passing through the torque converter. In this case, a torsional vibration due to the torque fluctuation of the engine occurs on the driving force transmitting system, thereby causing a problem that drivability is deteriorated due to a muffled noise being generated in a vehicle interior. Therefore, there exists a problem that the conventional vehicle control apparatus cannot simultaneously achieve drivability and gasoline mileage.

The present invention has been made to overcome the previously mentioned conventional problems, and it is therefore an object of the present invention to provide a vehicle control apparatus for a hybrid vehicle mounting a torque converter with a lock-up clutch which can better accomplish good drivability as well as good gasoline mileage than conventional vehicle control apparatuses.

Solution to Problem

To achieve the above object, a vehicle control apparatus according to the present invention comprises an internal combustion engine, an electric motor connected with the internal combustion engine, a torque converter arranged between the electric motor and driving wheels, the torque converter having a lock-up clutch provided therein and a battery that charges and discharges the electric motor, in which the lock-up clutch is operative to switch a transmission state between a disengaging state where the electric motor is disconnected from the driving wheels and an engaging state where the electric motor is connected with the driving wheels, and a lock-up region is expanded in a case that the battery is not under an input/output limited state compared with the lock-up region in a case that the battery is under the input/output limited state, during a time when the vehicle is driven at least by the internal combustion engine.

In the present description, the disengaging state of the lock-up clutch means not only a state where the motor is completely disconnected from the driving wheels, but also a state where there is slipping between the motor and the driving wheels, i.e., what is called a half-clutch. Further, connecting state of the lock-up clutch means a state where the motor is completely connected with the driving wheels without slipping.

In the present description, an input/output limitation of the battery bears a generic reference to both of an input limit value which is defined as a maximum electric power chargeable to the battery and an output limit value which is defined as a maximum electric power dischargeable from the battery, calculated from the residual electric power in the battery and a battery temperature.

In the present description, a state where the battery is under an input/output limited state means a state where the vehicle control apparatus suppresses the electronic motor and the battery from being charged or discharged. In this state, the battery may be overdischarged if the battery continues discharging to the motor, because electric power to be supplied to the electronic motor exceeds an output limit value of the battery. Further, the battery may be overcharged if the battery continues being charged, because electric power to be supplied to the electronic motor exceeds an input limit value of the battery. This means that the vehicle control apparatus is adapted to be unable to use the motor when the battery is under the input/output limited state.

In the present description, a state where the battery is not under the input/output limited state means a state where the vehicle control apparatus allows the electronic motor and the battery to be charged or discharged. In this state, the battery may not be overdischarged even if the battery continues discharging to the motor, because electric power to be supplied to electronic motor does not exceed the output limit value of the battery. Further, the battery may not be overcharged even if the battery continues to be charged, because electric power to be supplied to the electronic motor does not exceed the input limit value of the battery. This means that the vehicle control apparatus is adapted to be able to use the electronic motor when the battery is not under the input/output limited state.

In the present description, a lock-up region means a region where the lock-up clutch is allowed to be locked in a lock-up diagram, the abscissa thereof denoting the vehicle speed while the ordinate thereof denoting the accelerator opening degree.

By the construction as set forth in the above definition, the vehicle control apparatus expands the lock-up region, when the battery is not under the input/output limited state wherein the motor is allowed to be used, wider than the lock-up region when the battery is under the input/output limited state wherein the motor is not allowed to be used.

The vehicle control apparatus according to the present invention expands the lock-up region when the motor can be used, so that even if there is generated the torque fluctuation in the engine in a low vehicle speed region, the torque fluctuation can be mitigated by driving the motor. Accordingly, the vehicle control apparatus according to the present invention can prevent the drivability from being deteriorated due to the muffled noise being generated by the torque fluctuation of the engine, as observed in a conventional vehicle control apparatus wherein the lock-up region is expanded even in a case that the motor cannot be used.

Further, the vehicle control apparatus according to the present invention has an expanded lock-up region when the motor can be used, allowing the lock-up clutch to be used more frequently, thereby improving a transmitting efficiency of the driving force transmitting system and gasoline mileage. Therefore, the vehicle control apparatus can accomplish good drivability as well as good gasoline mileage by expanding the lock-up region when the motor can be used.

Furthermore, the vehicle control apparatus according to the present invention determines whether or not the lock-up region is expanded based on whether or not the battery is under the input/output limited state. Therefore, the vehicle control apparatus can determine whether or not the lock-up region is expanded by correctly determining whether or not the battery is under the input/output limited state when compared with a conventional vehicle control apparatus which determines whether or not the lock-up region is expanded based on SOC. Therefore, the vehicle control apparatus can securely achieve good drivability as well as good gasoline mileage by preventing the lock-up region from being erroneously expanded when the battery is under the input/output limited state though SOC of the battery is satisfied, as observed in a conventional vehicle control apparatus.

The vehicle control apparatus expands the lock-up region wider as an input/output limitation of the battery becomes larger in a case that the battery is not under the input/output limited state, when the vehicle is driven at least by the internal combustion engine.

By the construction as set forth in the above definition, the vehicle control apparatus expands the lock-up region wider as the input/output limitation of the battery is larger when the motor can be used. Therefore, the vehicle control apparatus can increase the output torque of the motor by supplying larger amount of electric power as the lock-up region is expanded wider. Accordingly, the vehicle control apparatus can generate a high output torque from the motor in response to the torque fluctuation of the engine being generated in a lower vehicle speed region, thereby preventing drivability of the vehicle from being deteriorated by the muffled noise being generated in the vehicle interior due to the torque fluctuation of the engine.

The vehicle control apparatus according to the present invention minimizes the lock-up region in a case that the battery is under the input/output limited state, when the vehicle is driven at least by the internal combustion engine.

By the construction as set forth in the above definition, the vehicle control apparatus unlocks the lock-up clutch when the muffled noise is being generated due to the torque fluctuation of the engine at low vehicle speed, because the lock-up region is minimized when the motor cannot be used. Therefore, in the vehicle control apparatus, the slipping is generated in the torque converter, so that the engine rotational speed can be increased to the extent that the muffled noise is not generated, while maintaining the vehicle speed. Accordingly, the vehicle control apparatus according to the present invention can prevent the drivability from being deteriorated due to the muffled noise being generated by the torque fluctuation of the engine, as observed in a conventional vehicle control apparatus wherein the lock-up region is expanded even in a case that the motor cannot be used.

The vehicle control apparatus according to the present invention is so constructed that the lock-up clutch has a slipping amount that can be decreased as a residual electric power in the battery is decreased, when the vehicle is driven only by the electric motor.

By the construction as set forth in the above definition, the electric power regenerated by the motor is increased when slipping amount in the lock-up clutch is small, so that the vehicle control apparatus can increase electric power regenerated by the motor as SOC is decreased and the battery has more charging margin. Therefore, the vehicle control apparatus can maintain good regenerating efficiency of the motor, while protecting the battery.

The vehicle control apparatus maximizes the lock-up region when residual electric power in the battery is less than a predetermined limit value and the vehicle is driven only by the electric motor. Here, the predetermined limit value is defined as a residual electric power below which the lock-up clutch is desirable to be slipped to decrease regenerating efficiency for protecting the battery when the motor regenerates electric power.

By the construction as set forth in the above definition, the vehicle control apparatus maximizes the lock-up region when SOC is less than the predetermined limit value wherein the lock-up clutch is engaged so that the battery can accept electric power regenerated by the motor. Accordingly, the slipping in the torque converter can be suppressed to improve a regenerating efficiency of the motor.

The vehicle control apparatus further comprises an accelerator pedal that sets an acceleration demand of a driver for at least one of the internal combustion engine and the electric motor, and the lock-up region is determined based on a vehicle speed and an opening degree of the accelerator pedal.

By the construction as set forth in the above definition, the vehicle control apparatus can select one of two driving modes, one is to improve gasoline mileage by locking the lock-up clutch and another is to improve drivability by unlocking the lock-up clutch based on an acceleration demand of the driver and the vehicle speed, and can securely achieve good drivability as well as good gasoline mileage.

The vehicle control apparatus according to the present invention sets the vehicle to a lower vehicle speed in a case that the lock-up region is expanded. By the construction as set forth in the above definition, the vehicle control apparatus can improve gasoline mileage because the lock-up clutch can be locked at lower vehicle speed.

The vehicle control apparatus according to the present invention further comprises a clutch disposed between the internal combustion engine and the electric motor, the clutch switching a transmission state between a disconnected state where the internal combustion engine and the electric motor are disconnected from each other and a connected state where the internal combustion engine and the electric motor are connected with each other, and the vehicle control apparatus sets the clutch to the disconnected state when the lock-up clutch is under the engaging state for regenerating electric power by the electric motor.

In the present description, a disengaging state of the clutch arranged between the engine and the motor means a state where the engine is completely disconnected from the motor. Moreover, an engaging state of the clutch between the motor and the engine means a state where the engine is securely connected with the motor without slipping of the clutch, as well as a state where slipping between the motor and the engine is allowed such as a half-clutch state.

By the construction as set forth in the above definition, the vehicle control apparatus disconnects the engine from the driving force transmitting system when electric power is regenerated by the motor by locking the lock-up clutch. Accordingly, the vehicle control apparatus can disconnect the engine load from the driving force transmitting system from the driving wheels to the motor, so that the regenerated energy in the motor can be secured. Therefore, the vehicle control apparatus can improve gasoline mileage by efficiently regenerating electric power from the motor.

Advantageous Effects of Invention

According to the present invention, there is provided the vehicle control apparatus for a hybrid vehicle mounting a torque converter with a lock-up clutch which can better accomplish good drivability as well as good gasoline mileage than conventional vehicle control apparatuses.

DESCRIPTION OF EMBODIMENTS

The preferable embodiment of the vehicle control apparatus according to the present invention will be described hereinafter with reference to the accompanying drawings. The present embodiment is a case that the vehicle control apparatus according to the present invention is applied to a driving system of a hybrid vehicle.

First, the construction of the driving system 1 will be explained hereinafter.

Figure 1:
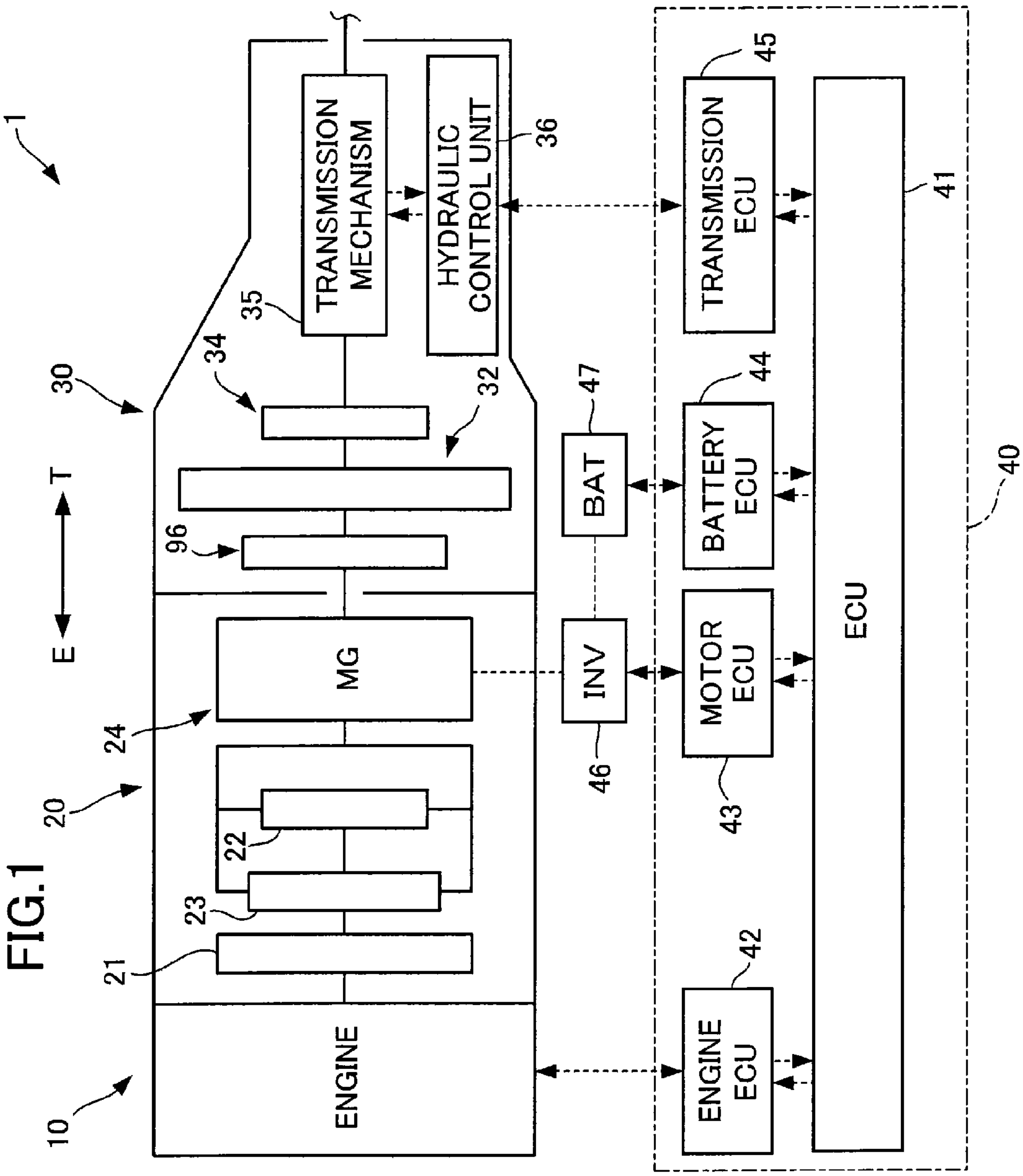
FIG. 1 is a skeleton diagram schematically showing a driving system having mounted thereon a vehicle control apparatus according to an embodiment of the present invention.
Figure 2:
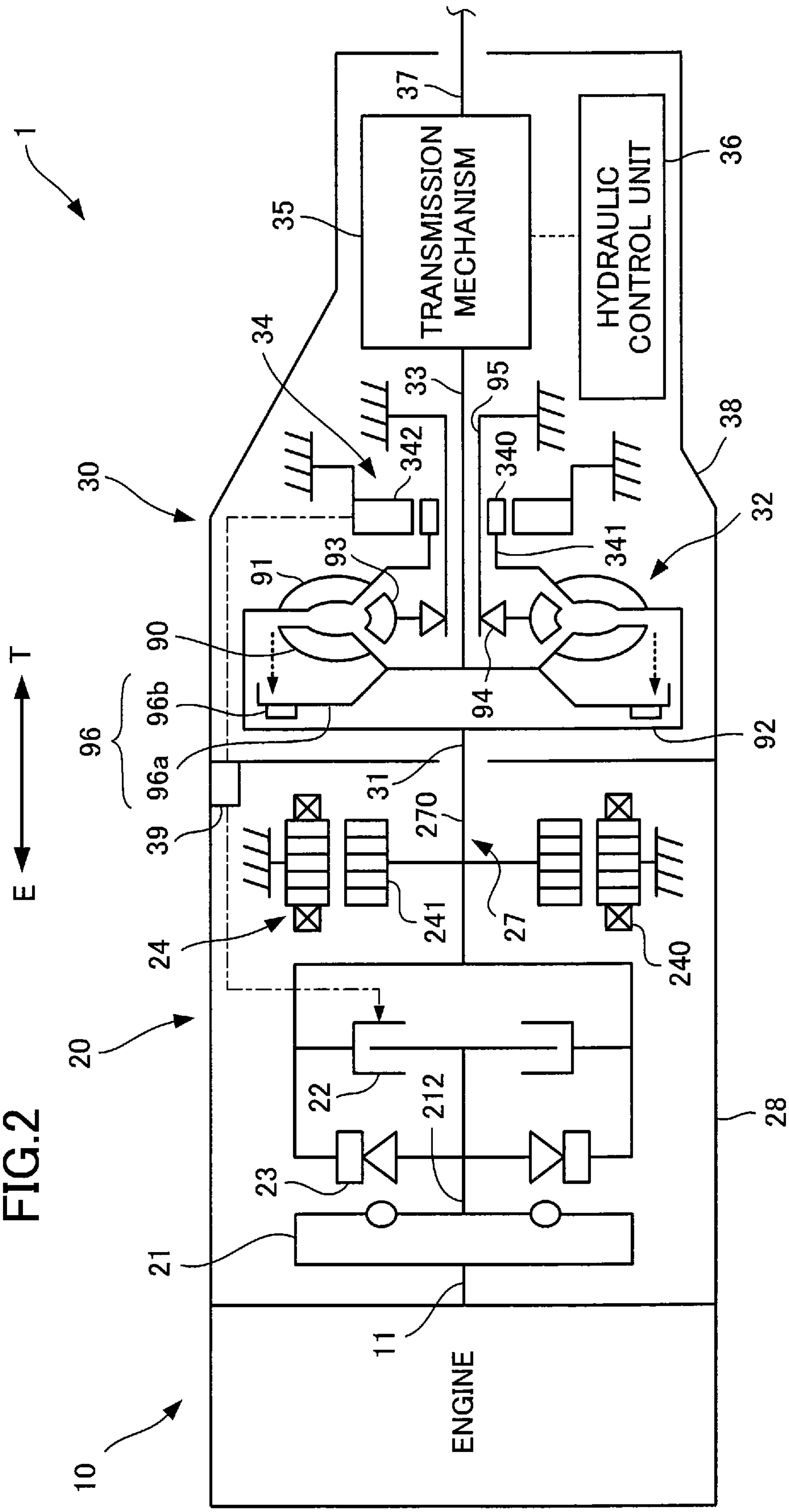
FIG. 2 is a skeleton diagram schematically showing a main part of a driving system having mounted thereon the vehicle control apparatus according to the embodiment of the present invention.
Figure 3:
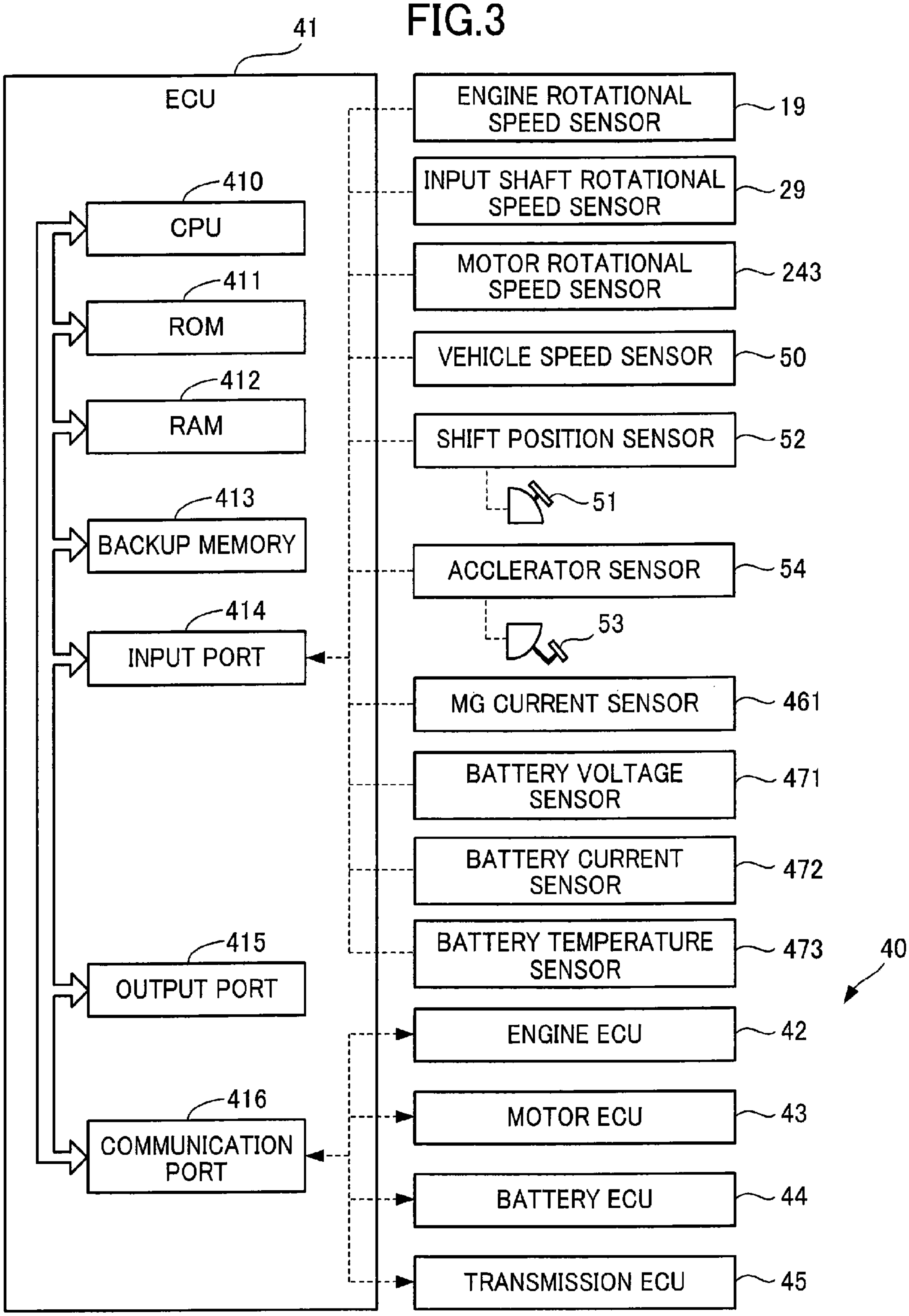
FIG. 3 is a block diagram showing a control unit of the vehicle control apparatus according to the embodiment of the present invention.

As shown in FIGS. 1 to 3, the driving system 1 has provided therein an engine 10, a driving unit 20, an automatic transmission 30 and a control unit 40. In the present embodiment, an engine side E and an automatic transmission side T are defined as the engine 10 side of the driving system 1 and the automatic transmission 30 side of the driving system 1, respectively.

The engine 10 is constituted by a publicly known power unit which outputs driving force by combusting mixture gas of hydrocarbon fuel, such as gasoline or light oil and air in a combustion chamber not shown. The engine 10 constitutes an internal combustion engine of the present invention. The engine 10 is adapted to reciprocate pistons not shown arranged inside a cylinder block by iterating a cycle of intake, explosion and exhaust in a combustion chamber, so that a crank shaft 11 connected to the pistons is rotated to transmit the driving force. The engine 10 is adapted to transmit a torque from the crank shaft 11 to the driving unit 20.

The crank shaft 11 has an engine rotational speed sensor 19 arranged in the vicinity thereof. The engine rotational speed sensor 19 is adapted to detect the rotational speed of the crank shaft 11 and to output a signal indicative of the rotational speed of the crank shaft 11 to the control unit 40.

The driving unit 20 has provided therein an input portion 21, a clutch 22, an one-way clutch 23, a motor generator 24, an output portion 27 and a casing portion 28. The motor generator 24 constitutes an electric motor of the present invention. The driving unit 20 is arranged between the engine 10 and the automatic transmission 30, and is adapted to transmit the driving force outputted from the crank shaft 11 of the engine 10 to a transmission input shaft 31 of the automatic transmission 30 as explained hereinafter.

The input portion 21 has a clutch input shaft 212 provided therein. The clutch input shaft 212 is coaxially arranged with the crank shaft 11. The clutch input shaft 212 is connected with the clutch 22 and the one-way clutch 23 to be integrally rotatable with each other, to transmit the driving force to the clutch 22 and the one-way clutch 23.

The output portion 27 provides a clutch output shaft 270. The clutch output shaft 270 is coaxially arranged with the clutch input shaft 212. The clutch output shaft 270 is connected with the clutch 22 and the one-way clutch 23 to be integrally rotatable with each other, and is adapted to transmit the driving force of the clutch 22 and the one-way clutch 23 to an external unit. The clutch output shaft 270 is connected to a transmission input shaft 31 of the automatic transmission 30 to be integrally rotatable with each other, to transmit the driving force outputted from the driving unit 20 to the automatic transmission 30.

The motor generator 24 has a stator 240 and a rotor 241 provided therein. The motor generator 24 is arranged on a driving force transmitting path between the crank shaft 11 and the transmission input shaft 31.

The stator 240 has a stator core not shown and a three phase coil also not shown wound around by the stator core provided therein. The stator core, for example, is formed by laminated magnetic steel sheets, and is secured to the casing portion 28. The stator 240 is adapted to generate a rotating magnetic field by supplying electric power to the three phase coil.

The rotor 241 is arranged inside the stator 240 and has a plurality of permanent magnets embedded therein.

The rotor 241 has a motor rotational speed sensor 243 arranged in the vicinity thereof. The motor rotational speed sensor 243 is adapted to detect a rotational speed of the motor generator 24 by detecting a rotational speed of the rotor 241 and to transmit a signal indicative of the rotational speed of the motor generator 24 to the control unit 40.

The motor generator 24 is adapted to work as an electric motor for rotating the rotor 241 by mutual action between a magnetic field generated by the permanent magnets embedded in the rotor 241 and a rotating magnetic field generated by the three phase coil. The motor generator 24 is also adapted to work as a generator for generating electric power between both terminals of the three phase coil by mutual action between a magnetic field generated by the permanent magnets embedded in the rotor 241 and a rotation of the rotor 241.

The motor generator 24 is connected with an inverter 46. The inverter 46 is connected with a battery 47. By this configuration, the motor generator 24 and the battery 47 are adapted to transfer electric power among each other through the inverter 46. The battery 47 is applied for charging electric power generated by the motor generator 24 or for discharging electric power depending on an operating condition of the hybrid vehicle.

An MG current sensor 461 is arranged on the power cable connecting the inverter 46 with the motor generator 24. The MG current sensor 461 is applied for detecting a phase electric current through the power cable and for transmitting a signal indicative of the electric current to the control unit 40. A battery voltage sensor 471 is arranged between the output terminals of the battery 47. The battery voltage sensor 471 is applied for detecting the output voltage of the battery 47, and for transmitting a signal indicative of the voltage to the control unit 40. A battery current sensor 472 is arranged on the output terminal of the battery 47. The battery current sensor 472 is applied for detecting a charge and discharge current of the battery 47, and for transmitting a signal indicative of the charge and discharge current to the control unit 40. A battery temperature sensor 473 is mounted on the battery 47. The battery temperature sensor 473 is applied for detecting temperature of the battery 47, and for transmitting a signal indicative of the temperature to the control unit 40.

The clutch 22 has equipped therein a multi-disc portion not shown and a piston portion also not shown. The clutch 22 is arranged between the input portion 21 and the output portion 27. The clutch 22 is installed between the crank shaft 11 and the transmission input shaft 31, and is arranged to connect and disconnect the crank shaft 11 and the transmission input shaft 31. This means that the clutch 22 is adapted to switch the transmission state between the disengaging state in which the engine 10 is disconnected from the motor generator 24 and the engaging state in which the engine 10 is connected with the motor generator 24.

The clutch 22 is a normally-open type. The clutch 22 is normally in the disengaging state where the engine 10 is disconnected from the motor generator 24. Further, the clutch 22 is operated by a high pressure hydraulic oil supplied from an oil pump 34, as explained hereinafter, of the automatic transmission 30, to have the engine 10 and the motor generator 24 connected with each other. The clutch 22 is arranged on an inner peripheral portion of the motor generator 24.

The one-way clutch 23 is arranged between the crank shaft 11 and the transmission input shaft 31, and is so connected to transmit only a rotational power in a positive rotational direction from the crank shaft 11 to the motor generator 24 through the transmission input shaft 31. Here, the positive rotational direction is defined as a rotational direction of the crank shaft 11. The one-way clutch 23 is installed in the inner peripheral portion of the motor generator 24. The one-way clutch 23 is arranged axially adjacent to the clutch 22 in the inner peripheral portion of the motor generator 24.

The clutch input shaft 212 has an input shaft speed sensor 29 arranged in the vicinity thereof. The input shaft speed sensor 29 is adapted to detect the rotational speed of the clutch input shaft 212, and to input a signal indicative of the rotational speed to the control unit 40. The input shaft speed sensor 29 may be a resolver, for example.

The automatic transmission 30 has provided therein the transmission input shaft 31, a torque converter 32, a transmission mechanism input shaft 33, the oil pump 34, a transmission mechanism 35, a hydraulic control unit 36, an output shaft 37 and a housing case 38. The automatic transmission 30 is connected with the motor generator 24.

The torque converter 32 is a hydraulic type employing circulating hydraulic oil, and is adapted to transmit a driving force transmitted from the clutch output shaft 270 of the driving unit 20 to the transmission mechanism 35 through the transmission input shaft 33. The torque converter 32 has provided therein a turbine runner 90, a pump impeller 91, a front cover 92, a stator 93, a one-way clutch 94, a hollow shaft 95 and a lock-up clutch 96. This means that the torque converter 32 is connected between the motor generator 24 and the driving wheels, and has the lock-up clutch 96 provided therein.

The turbine runner 90 and the pump impeller 91 are arranged to be held in a face-to-face relationship with each other, so that the turbine runner 90 is positioned in the engine side E. The turbine runner 90 is connected with the transmission mechanism input shaft 33 to be integrally rotatable with the transmission mechanism input shaft 33. The pump impeller 91 is connected with the transmission input shaft 31 to be integrally rotatable with the transmission input shaft 31. Inside the housing case 38 is supplied with the hydraulic oil.

Between the turbine runner 90 and the pump impeller 91 is arranged the stator 93 in an inner circumferential side of the turbine runner 90 and the pump impeller 91. The stator 93 is connected with the hollow shaft 95 through the one-way clutch 94. The hollow shaft 95 is secured to the housing case 38 and has the transmission mechanism input shaft 33 rotatably accommodated therein.

The lock-up clutch 96 provides a lock-up piston 96*a* and a friction member 96*b* fixed on the lock-up piston 96*a*. The lock-up clutch 96 is adapted to be pressed towards the engine side E by the high pressure hydraulic oil discharged from the oil pump 34 controlled by the hydraulic control unit 36, as shown by dotted arrows in FIG. 2. The lock-up piston 96*a* is moved towards the engine side E by the hydraulic oil, so that the friction member 96*a* is pressed against the front cover 92.

The lock-up clutch 96 is adapted to be switched to the engaging state by the lock-up piston 96*a* sliding towards the engine side E. In the engaging state, the friction member 96*b* is pressed against the front cover 92, so that the friction member 96*b* and the front cover 92 are connected with each other by friction, with the result that the front cover 92 is integrally rotated with the turbine runner 90. The lock-up clutch 96 is adapted to have the transmission input shaft 31 and the transmission mechanism input shaft 33 integrally rotatable with each other, so that there is not generated the slipping of the hydraulic oil, thereby making it possible to improve gasoline mileage.

The lock-up clutch 96 is adapted to be switched to the disengaging state in response to the lock-up piston 96*a* being slid towards the automatic transmission side T. In the disengaging state, the friction member 96*b* is spaced apart from the front cover 92, so that the friction member 96*b* and the front cover 92 are independently rotatable from each other. For this reason, the turbine runner 90 and the front cover 92 are independently rotatable from each other. The lock-up clutch 96 is adapted to be switched between the disengaging state where the transmission mechanism 35 is disconnected from the motor generator 24 and the engaging state where the transmission mechanism 35 is connected with the motor generator 24. Further, the hydraulic control unit 36 and the oil pump 34 collectively constitutes a lock-up clutch switching means for switching the lock-up clutch 96 between the disengaging state and the engaging state.

The oil pump 34 has a rotor 340, a hub 341 and a body 342 provided therein. The hub 341 has a cylindrical shape, and connects the rotor 340 with the pump impeller 91 so that the rotor 340 and the pump impeller 91 are integrally rotatable. The body 342 is fixed on the housing case 38. By this construction, the driving force from the driving unit 20 is transmitted from the front cover 92 to the rotor 340 through the pump impeller 91, thereby making it possible to drive the oil pump 34.

The hydraulic oil discharged from the oil pump 34 is supplied not only to the transmission mechanism 35, but also to the clutch 22 in the driving unit 20 as shown by the chain line in FIG. 2. The oil pump 34 is adapted to supply the hydraulic oil to change a gear stage or a gear ratio of the transmission mechanism 35 and to connect the clutch 22.

Between the oil pump 34 and the clutch 22 is arranged a hydraulic pressure regulating valve 39. The hydraulic pressure regulating valve 39 is adapted to regulate an amount of hydraulic oil supplied from the oil pump 34 to the clutch 22 in accordance with a control signal from the control unit 40.

The oil pump 34 and the hydraulic pressure regulating valve 39 collectively constitute a clutch switching means. The oil pump 34 and the hydraulic pressure regulating valve 39 are adapted to switch the clutch 22 from the disconnecting state to the connecting state.

The transmission mechanism 35 has a plurality of clutches and brakes not shown provided therein. In the transmission mechanism 35, an optimum shift range is formed by switching between the engaging state and the disengaging state of a plurality of clutches and a plurality of brakes by the pressure of the hydraulic oil supplied from the hydraulic control unit 36 in accordance with running states of the hybrid vehicle. For example, a N (neutral) range, D (drive) range, R (reverse) range, M (manual) range (sequential range), 2$^{nd}$ (second) range, L (low) range, B (brake) range, S (sport) range, and Ds (sport drive) range can be named as the shift ranges of the transmission mechanism 35.

The transmission mechanism 35 is connected with a shift lever 51 by which a driver of the vehicle changes gear stage. The shift lever 51 has a shift position sensor 52 mounted thereon. The shift position sensor 52 is adapted to detect a position of the shift lever 51 and to transmit a signal indicative of the shift position to the control unit 40.

The driving force outputted from the transmission mechanism input shaft 33 is transmitted to the output shaft 37 through the transmission mechanism 35 for driving the driving wheels through a differential gear not shown. This means that the motor generator 24 is connected with the driving wheels. The transmission mechanism 35 of the present embodiment is constituted as a multi-stage type, however the transmission mechanism 35 of the vehicle having mounted thereon the vehicle control apparatus according to the present invention is not limited to the multi-stage type but may alternatively employ, for example, a continuous variable transmission with a transmission clutch.

The control unit 40 comprises an electronic control unit for the hybrid vehicle (hereinafter referred to as ECU) 41, an electronic control unit for the engine (hereinafter referred to as engine ECU) 42, an electronic control unit for the motor (hereinafter referred to as motor ECU) 43, an electronic control unit for the battery (hereinafter referred to as battery ECU) 44 and an electronic control unit for the transmission mechanism (hereinafter referred to as transmission ECU) 45. The control unit 40 constitutes a control means in the present invention.

The ECU 41 provides a CPU (Central Processing Unit) 410, a ROM (Read Only Memory) 411 for storing a processing program, a RAM (Random Access Memory) 412 for temporarily storing data, a back-up memory 413, an input port 414, an output port 415, and a communication port 416. The ECU 41 is adapted to supervise the control of the hybrid vehicle.

The input port 414 of the ECU 41 is connected with the engine rotational speed sensor 19, the input shaft speed sensor 29, the motor rotational speed sensor 243, a vehicle speed sensor 50, an acceleration sensor 54, the shift position sensor 52, the MG current sensor 461, the battery voltage sensor 471, the battery current sensor 472, and the battery temperature sensor 473.

The vehicle speed sensor 50 is adapted to detect running speed of the vehicle and to transmit a signal indicative of the vehicle speed to the control unit 40. The accelerator sensor 54 is connected to an accelerator pedal 53. The accelerator sensor 54 is adapted to detect a depressed amount of the accelerator pedal 53, and to transmit a signal indicative of the depressed amount of the accelerator pedal 53 to the ECU 41. The ECU 41 is adapted to calculate an accelerator opening degree Acc based on the signal indicative of the depressed amount of the accelerator pedal 53 transmitted from the accelerator sensor 54.

The accelerator pedal 53 is adapted to set an acceleration demand of a driver for at least one of the engine 10 and the motor generator 24. The accelerator pedal 53 is adapted to set an acceleration demand of a driver and to operate the rotational speed of at least one of the engine 10 and the motor generator 24, in response to being depressed by the driver.

The ECU 41 is connected with the engine ECU 42, the motor ECU 43, the battery ECU 44, and the transmission ECU 45 through the communication port 416. The ECU 41 is adapted to exchange various control signals and data with the engine ECU 42, the motor ECU 43, the battery ECU 44 and the transmission ECU 45.

The engine ECU 42 is connected with the engine 10 and the ECU 41. The engine ECU 42 is adapted to be inputted with signals from various sensors which detect the operating condition of the engine 10 and to control the engine 10 with a fuel injection control, an ignition control and an intake air amount control and the like in accordance with the inputted signals.

The engine ECU 42 is adapted to communicate with the ECU 41. The engine ECU 42 is adapted to control the engine 10 with the control signals from the ECU 41, and to output data indicative of operating conditions of the engine 10 to the ECU 41 as needed.

The motor ECU 43 is connected with the inverter 46 and the ECU 41. The motor ECU 43 is adapted to control the motor generator 24. The motor ECU 43 is adapted to input signals necessary for controlling the motor generator 24. The signals necessary for controlling the motor generator 24 include a signal from the motor rotational speed sensor 243 mounted on the motor generator 24, a signal detected by the MG current sensor 461 indicative of the phase current flowing through the motor generator 24 and the like. The motor ECU 43 is adapted to output a switching control signal to the inverter 46.

The motor ECU 43 is adapted to communicate with the ECU 41. The motor ECU 43 is adapted to regulate a rotational speed and an output torque of the motor generator 24 by controlling the inverter 46 in accordance with control signals from the ECU 41. The motor ECU 43 is adapted to output data indicative of the operating conditions of the motor generator 24 to the ECU 41 as needed.

The battery ECU 44 is connected with the battery 47 and the ECU 41. The battery ECU 44 regulates the battery 47. The battery ECU 44 is adapted to be inputted with signals necessary for regulating the battery 47. For example, signals necessary for regulating the battery 47 include a signal indicative of an inter-terminal voltage from the battery voltage sensor 471, a signal indicative of charge and discharge current from the battery current sensor 472 and a signal indicative of battery temperature from the battery temperature sensor 473 and the like.

The battery ECU 44 is adapted to communicate with the ECU 41. The battery ECU 44 is adapted to output data indicative of operating conditions of the battery 47 to the ECU 41 as needed. The battery ECU 44 is adapted to calculate SOC of the battery 47 for regulating the battery 47 based on the accumulated value of charge and discharge current detected by the battery current sensor 472.

The battery ECU 44 is adapted to determine a predetermined limit value for SOC of the battery 47. The limit value is defined as a residual electrical quantity preferable for slipping the lock-up clutch 96 to protect the battery 47 when the battery is regenerated by the motor generator 24. The predetermined limit value is a threshold value to be applied when the ECU 41 determines whether or not the battery 47 is overcharged by the motor generator 24.

The battery ECU 44 is adapted to determine an input limit value $W_{in}$ and an output limit value $W_{out}$ of the battery 47. The battery ECU 44 is adapted to determine basic limit values of $W_{in}$ and $W_{out}$ based on the temperature of the battery, and to determine correction factors for $W_{in}$ and $W_{out}$ based on SOC. The battery ECU 44 is adapted to finally determine an input limit value $W_{in}$ and an output limit value $W_{out}$ by multiplying the basic limit values by correction factors. The battery ECU 44 is adapted to calculate the input limit value $W_{in}$ and the output limit value $W_{out}$ from SOC and the battery temperature with reference to an SOC battery temperature map for calculating the input limit value Wi and the output limit value $W_{out}$ based on a preliminarily set relationship between SOC and the battery temperature.

Further, the battery ECU 44 is adapted to determine whether or not the battery 47 is under the input/output limited state.

The ECU 41 is adapted to calculate electric power to be supplied to the motor generator 24 by the battery 47 on the basis of the vehicle running state such as the vehicle speed. The battery ECU 44 is adapted to determine that the battery 47 is under the input/output limited state, for example, when the electric power to be supplied to the motor generator 24 by the battery 47 exceeds the output limit value $W_{out}$ of the battery 47. On the other hand, the battery ECU 44 is adapted to determine that the battery 47 is not under the input/output limited state, for example, when the electric power to be supplied to the motor generator 24 by the battery 47 falls below the output limit value $W_{out}$ of the battery 47.

The ECU 41 is adapted to calculate electric power to be charged to the battery 47 by the motor generator 24 on the basis of the motor rotational speed $N_M$. The battery ECU 44 is adapted to determine that the battery 47 is under the input/output limited state, for example, when the electric power to be charged to the battery 47 by the motor generator 24 exceeds the input limit value $W_{in}$ of the battery 47. The battery ECU 44 is adapted to determine that the battery 47 is not under the input/output limited state, for example, when the electric power to be charged to the battery 47 by the motor generator 24 falls below the input limit value $W_{in}$ of the battery 47.

The transmission ECU 45 is connected with the automatic transmission 30 and the ECU 41. The transmission ECU 45 is adapted to control the lock-up clutch 96 of the torque converter 32, and to change the gear stage of the transmission mechanism 35.

The transmission ECU 45 is adapted to communicate with the ECU 41. The transmission ECU 45 is adapted to perform the shift control to change the gear stage of the transmission mechanism 35 in accordance with the signal from the ECU 41. The transmission ECU 45 is adapted to transmit data indicative of the operating condition of the transmission mechanism 35 and the torque converter 32 to the ECU 41 as needed.

As set forth in foregoing definitions, the engine 10, the motor generator 24, the torque convertor 32 and the battery 47 constitute a part of the vehicle control apparatus according to the present embodiment. The vehicle control apparatus according to the present embodiment is adapted to expand the lock-up region in the case that the battery 47 is not under the input/output limited state, wider than the lock-up region in the case that the battery 47 is under the input/output limited state, when the vehicle is driven at least by the engine 10, i.e., when the vehicle is in EHV running state. The vehicle control apparatus according to the present embodiment is adapted to expand the lock-up region wider as the input/output limitation of the battery 47 becomes larger, in the case that the battery 47 is not under the input/output limited state, when the vehicle is driven at least by the engine 10, i.e., when the vehicle is in EHV running state.

The vehicle control apparatus according to the present embodiment minimizes the lock-up region, when the battery 47 is under the input/output limited state while the vehicle is driven at least by the engine 10, that is, the vehicle is in EHV running state.

The vehicle control apparatus according to the present embodiment is adapted to set slipping amount in the lock-up clutch 96 smaller as SOC is decreased, while the vehicle is driven only by the motor generator 24, i.e., when the vehicle is in EV running state. The vehicle control apparatus according to the present embodiment is adapted to maximize the lock-up region, when SOC is smaller than a predetermined value while the vehicle is driven only by the motor generator 24, i.e., when the vehicle is in EV running state.

The vehicle control apparatus according to the present embodiment has provided therein the engine rotational speed sensor 19, the motor rotational speed sensor 243, the vehicle speed sensor 50, the motor ECU 43, the battery ECU 44 and the ECU 41. The ECU 41 is adapted to determine whether the vehicle is in EHV running state where the vehicle is driven at least by the engine 10 or the vehicle is in EV running state where the vehicle is driven only by the motor generator 24, for example, by comparing the rotational speed $N_E$ of the engine 10 with the rotational speed $N_M$ of the motor generator 24, when the vehicle speed is larger than zero.

In addition, the vehicle control apparatus according to the present embodiment has provided therein the lock-up clutch 96, a lock-up clutch switching means, the clutch 22, and a clutch switching means. The ECU 41 is adapted to switch the transmission state of the lock-up clutch 96 by controlling the lock-up clutch switching means. The ECU 41, which has a clutch flag arranged therein, is adapted to control the clutch switching means by setting the clutch flag on/off, so that the clutch 22 is switched.

Further, the vehicle control apparatus according to the present embodiment has the accelerator pedal 53 and the accelerator sensor 54 provided therein. The ECU 41 is adapted to determine the lock-up region based on the vehicle speed and an accelerator opening degree Acc.

Figure 7:
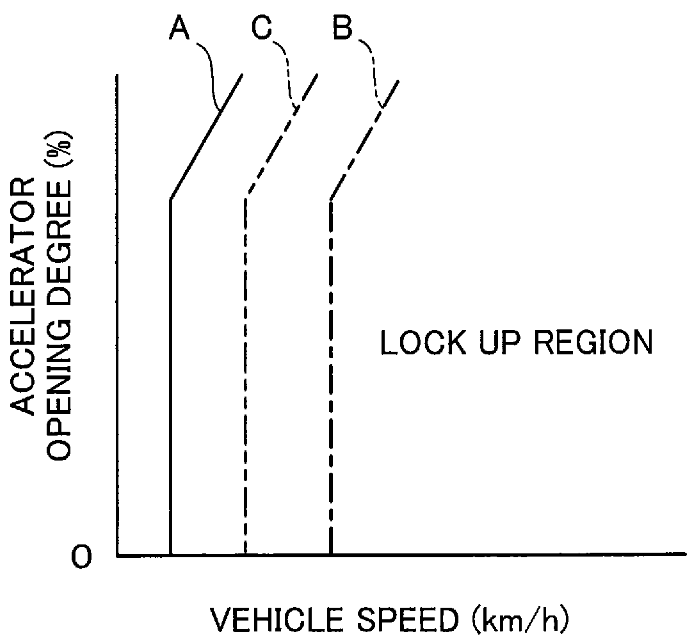
FIG. 7 is a graph showing a vehicle speed and accelerator opening degree map applied for the vehicle control apparatus according to the embodiment of the present invention.

The ROM 411 and backup memory 413 are respectively stored therein with a VS-Acc map for determining whether the lock-up clutch 96 is connected or disconnected depending on the vehicle speed VS and accelerator opening degree Acc, i.e., the lock-up region map, as shown in FIG. 7. The ECU 41 is adapted to determine whether the lock-up clutch 96 is engaged or disengaged based on the current vehicle speed and current accelerator opening degree with reference to the VS-Acc map. Further, the vehicle control apparatus according to the present embodiment is adapted to lower the vehicle speed when the lock-up region is to be expanded.

Figure 8:
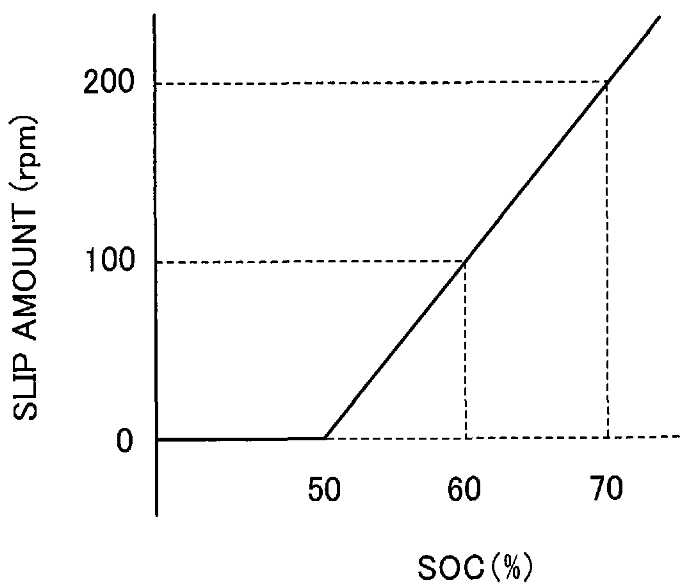
FIG. 8 is a graph showing the relationship between SOC and a slip amount of the lock-up clutch in the vehicle control apparatus according to the embodiment of the present invention.

The ROM 411 and the back up memory 413 are respectively stored therein with an SOC-slip amount map for determining the slipping amount in the lock-up clutch 96 based on SOC, for example, as shown in FIG. 8. The ECU 41 is adapted to determine the slipping amount in the lock-up clutch 96 with respect to SOC, with reference to the SOC-slip amount map when SOC exceeds the limit value. In the present embodiment, the smaller the SOC, the smaller the slipping amount in the lock-up clutch 96. The SOC-slip amount map shown in FIG. 8 is only an example, and other maps may be applied for a vehicle control apparatus according to the present invention.

Further, the vehicle control apparatus according to the present embodiment is adapted to switch the clutch 22 to the disconnected state when the lock-up clutch 96 is switched to the engaged state to have the electric power regenerated by the motor generator 24.

Next, the operation will be explained hereinafter.

Figure 4:
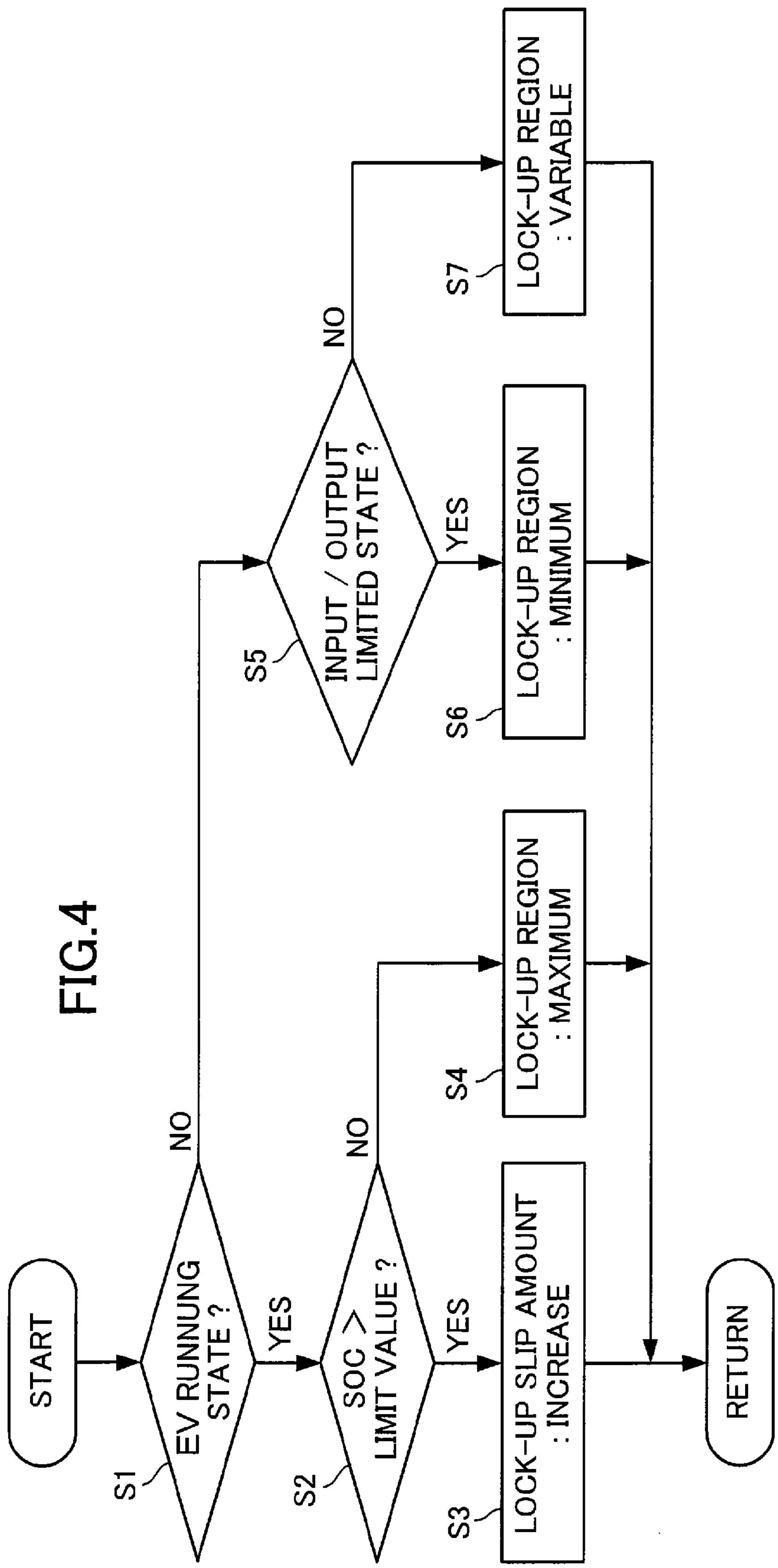
FIG. 4 is a flowchart explaining the operation of the vehicle control apparatus according to the embodiment of the present invention.

In the present embodiment, it is assumed that the hybrid vehicle is running under EV running state or EHV running state. As shown in FIG. 4, the ECU 41 determines whether or not the vehicle is running under EV running state where the vehicle is driven only by the motor generator 24 (Step S1). The ECU 41 determined that the vehicle is running under EV running state, for example, when the vehicle speed is not zero and the engine rotational speed $N_E$ is not equal to the motor rotational speed $N_M$.

When the ECU 41 determines that the vehicle is running under EV running state (Step S1: YES), the ECU 41 determines whether or not SOC exceeds the limit value (Step S2). The ECU 41 may preferably be adapted to allow the slipping of the lock-up clutch 96 during the time when regeneration is being performed by the motor generator 24 in order to avoid the battery 47 from being overcharged, if SOC exceed the limit value. For this reason, when the ECU 41 determines that SOC exceeds the limit value (Step S2: YES), the ECU 41 allows the slipping of the lock-up clutch 96 with an amount determined on basis of SOC, regardless of the setting at the lock-up region (Step S3).

The relationship between SOC and the slipping amount in the lock-up clutch 96 is determined so that allowable slipping amount in the lock-up clutch 96 is decreased as SOC is decreased, for example, as shown in the SOC-slip amount map in FIG. 8.

The ECU 41 can increase electric power regenerated by the motor generator 24, because the ECU 41 reduces allowable slipping amount of the lock-up clutch 96 as SOC is decreased. Therefore, a regeneration efficiency of the motor generator 24 can be maintained, while protecting the battery 47. The ECU 41 returns a control to a main routine, after the ECU 41 sets the slipping amount of the lock-up clutch 96.

The ECU 41 is preferably adapted to engage the lock-up clutch 96 when regeneration is performed by the motor generator 24 when SOC does not exceed the limit value, because it is not necessary to protect the battery 47 from being overcharged. Therefore, when the ECU 41 determines that SOC does not exceed the limit value (Step S2: NO), the ECU 41 is adapted to maximize the lock-up region (Step S4). In the present embodiment, the ECU 41 determines the lock-up region as a region of high vehicle speed side of line A which is maximally shifted towards low vehicle speed side as shown in FIG. 7.

For this reason, the ECU 41 can lock up the lock-up clutch 96 while the vehicle is running at low vehicle speed, for example, in all the gear stages of the transmission mechanism 35. Therefore, the ECU 41 can lock up the lock-up clutch 96 while running at any one of $1^{st}$-$8^{th}$ gear ranges when the vehicle is provided with the transmission mechanism 35 of eight stages, thereby making it possible to improve a regeneration efficiency of the motor generator 24.

Further, the ECU 41 is adapted to switch the clutch 22 to the disconnected state as needed, when the motor generator 24 regenerates electric power by switching the lock-up clutch 96 to the engaged state. Therefore, the ECU 41 can disconnect the engine 10 from the driving force transmission system ranging from the driving wheels to the motor generator 24, so that the regeneration energy of the motor generator 24 can be secured. The ECU 41 returns the control to the main routine after maximizing the lock-up region.

The ECU 41 determines whether or not the battery 47 is in the input/output limited state (Step S5), when the ECU 41 determines that the vehicle is not running under the EV running state (Step S1: NO). The above determination is performed by the battery ECU 44 based on a comparison between the input/output limit values $W_{in}$ and $W_{out}$ of the battery 47 and the actual value of charge and discharge of the motor generator 24.

The ECU 41 cannot use the motor generator 24, when the battery 47 is under the input/output limited state. Therefore, the ECU 41 is adapted to minimize the lock-up region (Step S6), when the ECU 41 determines that the battery 47 is under the input/output limited state (Step S5: YES). In the present embodiment, the ECU 41 sets the lock-up clutch region as a region of high vehicle speed side of line B which is maximally shifted towards high vehicle speed side as shown in FIG. 7.

Therefore, for example, the ECU 41 locks up the lock-up clutch 96 while the vehicle is running at any one of $5^{th}$-$8^{th}$ gear ranges in a case that the transmission mechanism 35 is equipped with an eight-stage transmission. Therefore, the ECU 41 disconnects the lock-up clutch 96, when there is a muffled noise being generated due to the torque fluctuation of the engine 10 when the vehicle is running at low speed. For this reason, there is a slipping generated in the torque convertor 32, so that the ECU 41 can keep the engine rotational speed $N_E$ sufficiently high not to generate the muffled noise, while keeping the vehicle speed. The ECU 41 returns the control to the main routine after minimizing the lock-up region.

The ECU 41 can use the motor generator 24, when the battery is not under the input/output limited state. Therefore, when the ECU 41 determines that the battery is not under the input/output limited state (Step S5: NO), the ECU 41 expands the lock-up region wider than the lock-up region under the input/output limited state (Step S7). The ECU 41 expands the lock-up region wider as the input/output limit values $W_{in}$ and $W_{out}$ are larger. In the present embodiment, the ECU 41 defines the lock-up region to be a region in high vehicle speed side of a line C, which can be shifted between line A and line B as shown in FIG. 7.

For this reason, the ECU 41 can reduce the torque fluctuation of the engine 10 by activating the motor generator 24 even if there is the torque fluctuation generated in the engine 10 while the vehicle is running at a low speed, thereby making it possible to suppress the drivability from being deteriorated due to the muffled noise in a vehicle interior. Additionally, the ECU 41 can improve gasoline mileage of the vehicle by raising the transmitting efficiency of the driving force transmission system. The ECU 41 returns the control to the main routine after appropriately setting the lock-up region between the maximum lock-up region and the minimum lock-up region.

Figure 5:
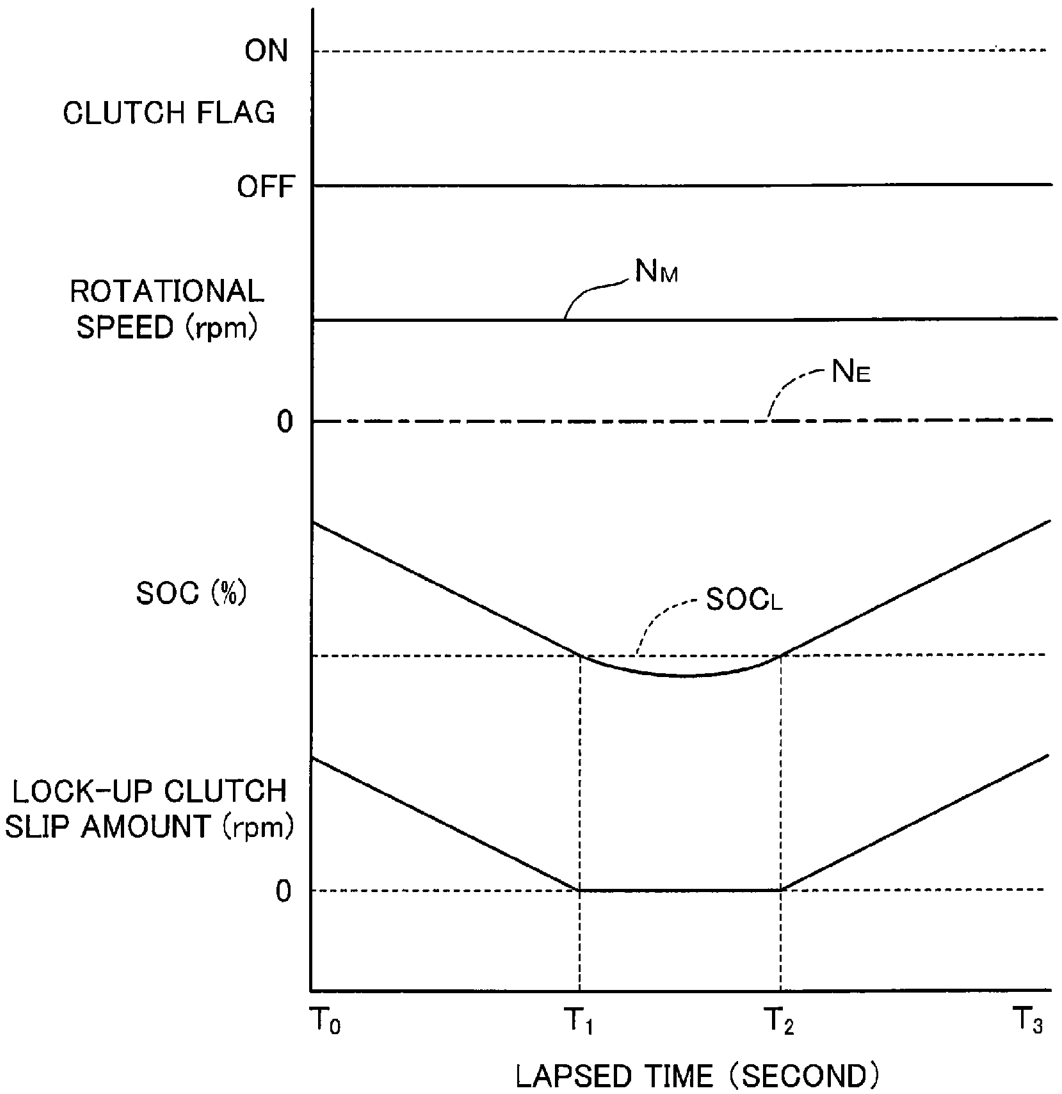
FIG. 5 is a time chart explaining the operation of the vehicle control apparatus according to the embodiment of the present invention when the vehicle is under an EV running state where the vehicle is driven only by the driving force of the motor.

Operations in a case that the aforementioned hybrid vehicle is running under EV running state where the hybrid vehicle is driven only by the motor generator 24 and the engine 10 is stopped will be explained hereinafter with reference to a time chart as shown in FIG. 5.

As shown in FIG. 5, a clutch flag is in off state, and therefore the clutch 22 is in disconnected state. The motor rotational speed $N_M$ is a rotational speed required for EV running, and the engine rotational speed $N_E$ is zero. SOC fluctuates in accordance with the running state of the vehicle. In the present embodiment, SOC being larger than the limit value $SOC_L$ at time $T_0$ is gradually decreased to be equal to the limit value $SOC_L$ at time $T_1$, then SOC remains smaller than the limit value $SOC_L$ from time $T_1$ to time $T_2$, and is gradually increased larger than the limit value $SOC_L$ from time $T_2$ to time $T_3$.

The ECU 41 controls the lock-up clutch 96 so that slipping is allowed, because SOC is larger than the limit value $SOC_L$ between $T_0$ and $T_1$. Further, the ECU 41 gradually decreases the slipping amount of the lock-up clutch 96, because SOC gradually decreases between $T_0$ and $T_1$.

The ECU 41 keeps the lock-up clutch 96 under the engaged state between $T_1$ and $T_2$, because SOC is smaller than the limit value $SOC_L$ between $T_1$ and $T_2$. The ECU 41 controls the lock-up clutch 96 so that slipping is allowed, because SOC is larger than the limit value $SOC_L$ between $T_2$ and $T_3$. Further, the ECU 41 gradually increases the slipping amount of the lock-up clutch 96, because SOC gradually increases between $T_2$ and $T_3$.

In the above-mentioned hybrid vehicle, an operation that the vehicle is running under EHV running state where the vehicle is driven at least by the engine 10 is explained with reference to a time chart shown in FIG. 6.

Figure 6:
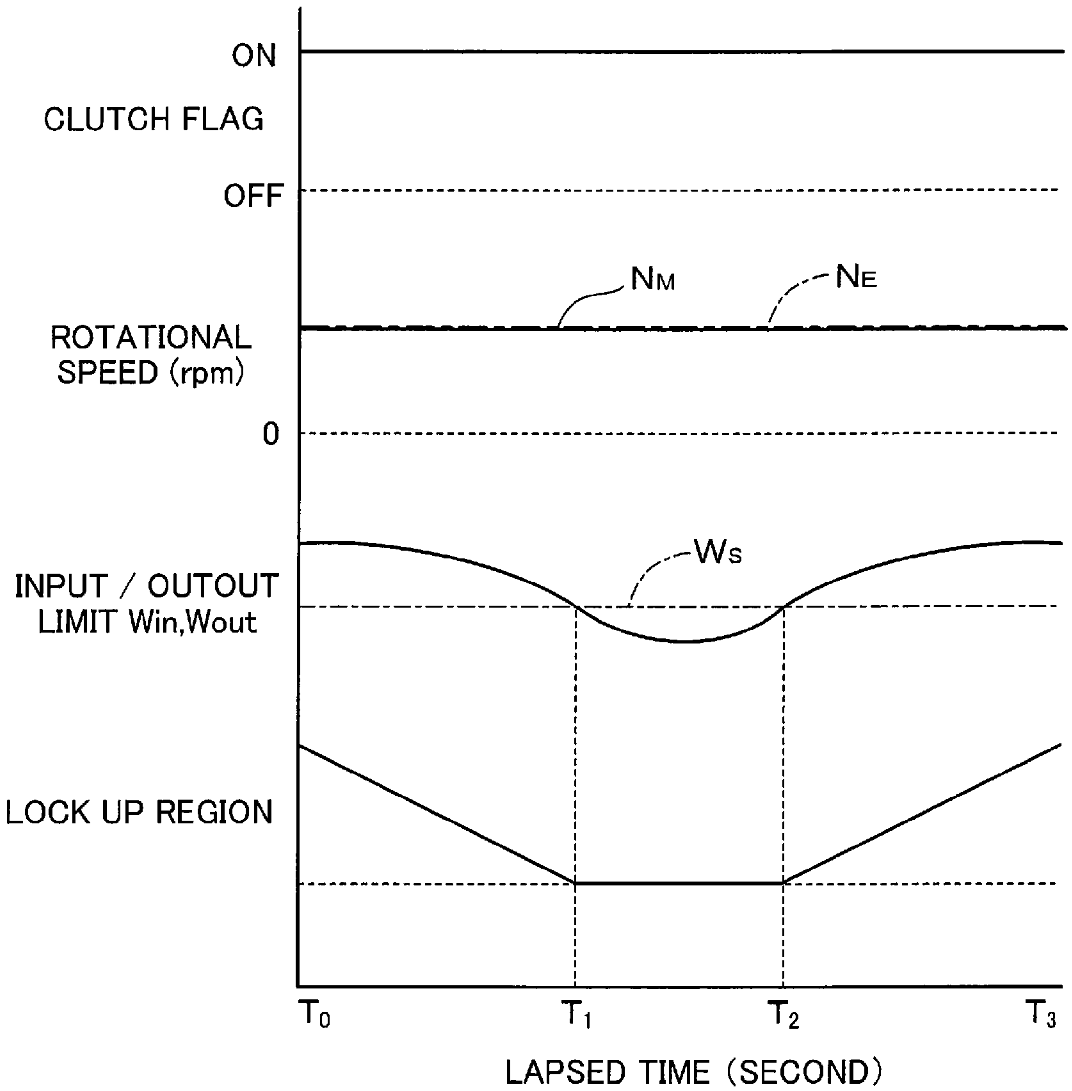
FIG. 6 is a time chart explaining the operation of the vehicle control apparatus according to the embodiment of the present invention when the vehicle is under an EHV running state where the vehicle is driven at least by the driving force of the engine.

As shown in FIG. 6, a clutch flag is in on state, and the clutch 22 is in connected state. The motor rotational speed $N_M$ and the engine rotational speed $N_E$ are the same rotational speed required for EHV running. The input limit value $W_{in}$ and the output limit value $W_{out}$ of the battery 47 fluctuate in response to the running state of the vehicle.

Here, for simplification of explanation, both of an electric power to be supplied from the battery 47 to the motor generator 24 and an electric power to be charged from the motor generator 24 to the battery 47 are shown in FIG. 6 as a predetermined standard electric power Ws. Here, from $T_0$ to $T_1$, the input/output limitation of the battery 47, $W_{in}$ and $W_{out}$, are larger than the standard electric power Ws and are gradually being decreased, then from $T_1$ to $T_2$, $W_{in}$ and $W_{out}$ are smaller than the standard electric power $W_S$, and then from $T_2$ to $T_3$, $W_{in}$ and $W_{out}$ are larger than the standard electric power $W_S$, and are gradually being increased. Therefore, the battery 47 is not under the input/output limited state from $T_0$ to $T_I$, the battery 47 is under the input/output limited state from $T_1$ to $T_2$, and the battery 47 is not under the input/output limited state from $T_2$ to $T_3$.

The ECU 41 controls the lock-up region between the maximum region and the minimum region, because the battery 47 is not under the limiting condition from $T_0$ to $T_1$. Further the ECU 41 gradually reduces the lock-up region, because the input/output limit values $W_{in}$ and $W_{out}$ are gradually decreased from $T_0$ to $T_I$.

The ECU 41 minimizes the lock-up region, because the battery 47 is under the input/output limited state from $T_1$ to $T_2$. The ECU 41 controls the lock-up region between the maximum region and the minimum region, because the battery 47 is not under the input/output limited state from $T_2$ to $T_3$. Further the ECU 41 gradually increases the lock-up region, because the input/output limit values $W_{in}$ and $W_{out}$ are gradually increased from $T_2$ to $T_3$.

On the other hand, when the engine 10 is suspending and the hybrid vehicle is stopping for parking or the like, the clutch 22 stays under the disconnected state, because the oil pump 34 is being suspended. At this time, the shift position of the transmission mechanism 35 is positioned at a neutral position. Further, the hydraulic pressure regulating valve 39 is opened.

The motor generator 24 is supplied with electric power to start the engine 10 when the engine 10 is suspending and the hybrid vehicle is stopping for parking or the like. By supply of the electric power to the motor generator 24, the motor generator 24 starts to rotate the rotor 241 thereof. The driving force of the rotor 241 is transmitted to the oil pump 34 through a transmitting path comprising the clutch output shaft 270 and the torque converter 32.

Here, the driving force generated by the motor generator 24 is not transmitted to the engine 10 even though the rotor 241 is rotating, because the clutch 22 and the one-way clutch 23 are disconnected. Further, the output shaft 37 of the transmission mechanism 35 is not rotated even though the transmission input shaft 33 of the transmission mechanism 35 is rotated by the rotation of the torque converter 32, because the shift position of the transmission mechanism 35 is set at the neutral position.

The clutch 22 is connected in response to the hydraulic oil discharged from the oil pump 34 being supplied to the clutch 22, so that the driving force of the rotor 241 is transmitted to the crankshaft 11 through the input portion 21, thereby causing the engine 10 started.

When the vehicle starts running after the engine 10 is started, the driving force generated by the engine 10 is transmitted to the automatic transmission 30 through a transmitting path including the crankshaft 11, the input portion 21, the clutch 22, the rotor 241 and the clutch output shaft 270. As the oil pump 34 is driven by the driving force transmitted to the automatic transmission 30, the hydraulic oil is continuously supplied to the clutch 22, so that the connection of the clutch 22 is maintained. At this timing, the shift position of the transmission mechanism 35 is set to the forward stage or the reverse stage. Therefore, the driving force of the crankshaft 11 is transmitted to the driving wheels through the automatic transmission 30, so that the hybrid vehicle starts running.

On the other hand, when the engine 10 is suspending its operation and the hybrid vehicle is stopping for parking and the like, the clutch 22 remains in the disengaging state. When the vehicle is started only by the driving force of the motor generator 24, the motor generator 24 is electrified. When the motor generator 24 is electrified, the rotor 241 of the motor generator 24 starts rotating. The driving force of the rotor 241 is transmitted to the oil pump 34 through the transmitting path comprising the clutch output shaft 270 and the torque converter 32.

The driving force generated by the motor generator 24 is not transmitted to the engine 10 even though the rotor 241 is rotated, because the clutch 22 and the one-way clutch 23 are kept in the disengaging state. In addition, the hydraulic pressure regulating valve 39 is closed, so that the hydraulic oil discharged from the oil pump 34 is not supplied to the clutch 22.

The transmission input shaft 33 of the transmission mechanism 35 is rotated in response to the rotation of the torque converter 32. At this timing, the shift position of the transmission mechanism 35 is set to the forward stage or the reverse stage. Therefore, the driving force of the crankshaft 11 is transmitted to the driving wheels through the automatic transmission 30, so that the hybrid vehicle starts running.

As will be understood from the foregoing description, the ECU 41 of the vehicle control apparatus according to the present embodiment expands the lock-up region, when the vehicle is running under EHV state and the motor generator 24 can be used. Therefore, even though there is generated a torque fluctuation in the engine 10 at a low vehicle speed region, the torque fluctuation can be mitigated by driving the motor generator 24. Accordingly, the vehicle control apparatus according to the prevent invention can suppress drivability from being deteriorated caused by the muffled noise in the vehicle interior due to the torque fluctuation in the engine 10 at the low vehicle speed region.

Further, the ECU 41 expands the lock-up region when the vehicle is running under EHV state and the motor generator 24 can be used. Therefore, gasoline mileage of the vehicle can be improved by improving transmitting efficiency of the driving force transmitting system. Accordingly, the vehicle control apparatus according to the present invention can simultaneously achieve good drivability as well as good gasoline mileage by expanding the lock-up region when the motor generator 24 can be used.

Furthermore, the ECU 41 determines whether or not the lock-up region is expanded based on whether or not the battery 47 is under the input/output limited state. Therefore, the ECU 41 can reliably determine whether or not the motor generator 24 can be used to determine whether or not the lock-up region is expanded, thereby making it possible to precisely realize a simultaneous achievement of good drivability and good gasoline mileage.

Still further, the ECU 41 of the vehicle control apparatus according to the present embodiment expands the lock-up region, as the input/output limitation of the battery 47 is increased when the vehicle is running under EHV state and the motor generator 24 can be used. By this reason, the ECU 41 is allowed to supply larger electric power to the motor generator 24 for generating higher output torque of the motor generator 24 as the lock-up region is more widely expanded. Accordingly, the ECU 41 can generate the higher output torque from the motor generator 24 against the torque fluctuation in the engine 10 generated at the lower vehicle speed region, thereby making it possible to suppress drivability from being deteriorated caused by the muffled noise in the vehicle interior due to the torque fluctuation at the low vehicle speed region.

Moreover, the vehicle control apparatus according to the present embodiment minimizes the lock-up region when the vehicle is running in EHV state and the motor generator 24 cannot be used. Therefore, the vehicle control apparatus unlocks the lock-up clutch 96, when the muffled noise is generated due to the torque fluctuation of the engine 10 at the low vehicle speed region. For this reason, there is generated the slipping in the torque converter 32, so that the ECU 41 can increase the engine rotational speed $N_E$ to the extent that there is not generated the muffled noise, while maintaining the vehicle speed. Accordingly, the ECU 41 can suppress drivability from being deteriorated caused by the muffled noise being generated in the engine 10 due to the torque fluctuation of the engine 10 at the low vehicle speed region.

The ECU 41 of the vehicle control apparatus according to the present embodiment can increase the slipping amount of the lock-up clutch 96 as the SOC becomes smaller as long as the SOC stays larger than the predetermined limit value when the vehicle is in the EV running state, thereby making it possible to increase the regenerating electric power of the motor generator 24. Accordingly, the ECU 41 can maintain the regenerating efficiency of the motor generator 24 while protecting the battery 47.

The ECU 41 of the vehicle control apparatus according to the present embodiment is adapted to lock up the lock-up clutch 96, so that the battery 47 becomes chargeable, and to maximizes the lock-up region, when the SOC is smaller than the predetermined limit value while the vehicle is in EV running state. Accordingly, the ECU 41 can improve regenerating efficiency of the motor generator 24 by suppressing the slipping from being generated in the torque converter 32.

Further, the ECU 41 of the vehicle control apparatus according to the present embodiment determines the lock-up region based on the vehicle speed and the accelerator opening degree. Therefore, the ECU 41 can selectively determine whether to lock up the lock-up clutch 96 to improve gasoline mileage or to unlock the lock-up clutch 96 to improve drivability, based on the acceleration demand of the driver and the vehicle speed, so that the ECU 41 can simultaneously achieve drivability and gasoline mileage in a good balance.

The ECU 41 is adapted to set the vehicle to a lower vehicle speed in a case that the lock-up region is expanded. Therefore, the ECU 41 can lock up the lock-up clutch 96 when the vehicle is driven in a lower vehicle speed, so that gasoline mileage can be improved in a lower vehicle speed region.

The ECU 41 of the vehicle control apparatus according to the present embodiment controls the lock-up clutch 96 in response to SOC in EV running state. However, the vehicle control apparatus according to the present invention is not limited to the above mentioned construction, and known method of controlling the lock-up clutch may be applied.

The ECU 41 of the vehicle control apparatus according to the present embodiment minimizes the lock-up region when the battery 47 is under the input/output limited state in EHV running state. However, the vehicle control apparatus according to the present invention is not limited to the above mentioned construction, and known method of determining the lock-up region may be appropriately applied to controlling the lock-up region when the battery 47 is under the input/output limited state in EHV running state.

The vehicle control apparatus according to the present invention provides the clutch 22 between the engine 10 and the motor generator 24. However, the vehicle control apparatus according to the present invention is not limited to above mentioned construction, and the clutch 22 between the engine 10 and the motor generator 24 may be omitted. In this case, the construction of the vehicle can be simplified.

The vehicle control apparatus according to the present invention provides only one motor generator 24. However, the vehicle control apparatus according to the present invention is not limited to the above mentioned construction, and more than two motor generators may be provided therein.

The vehicle control apparatus according to the present embodiment is provided with the driving unit 20 in which the clutch 22 and the one-way clutch 23 are arranged in tandem along an inner peripheral portion of the rotor 241. However, the vehicle control apparatus according to the present invention is not limited to the above construction, and may be provided with a driving unit 20 in which the clutch 22 and the one-way clutch 23 are arranged so as to overlap axially each other in the inner peripheral portion of the rotor 241.

As explained above, the vehicle control apparatus according to the present invention is useful for a hybrid vehicle comprising a torque converter with a lock-up clutch, because the vehicle control apparatus according to the present invention provides an advantageous effect to simultaneously achieve good drivability and good gasoline mileage.

EXPLANATION OF REFERENCE NUNERALS

1: driving system
10: engine
20: driving unit
22: clutch
24: motor generator
30: automatic transmission
32: torque converter
34: oil pump
35: transmission mechanism
40: control unit
41: ECU
42: engine ECU
43: motor ECU
44: battery ECU
45: transmission ECU
47: battery
96: lock-up clutch

The invention claimed is:

1. A vehicle control apparatus comprising:

an internal combustion engine, an electric motor connected with the internal combustion engine, a torque converter arranged between the electric motor and driving wheels, the torque converter having a lock-up clutch provided therein, and a battery that charges and discharges the electric motor, wherein the lock-up clutch is operative to switch a transmission state between a disengaging state and an engaging state, and a lock-up region, in which the lock-up clutch is permitted to be in the engaging state, is expanded in a case that the battery is not under an input/output limited state compared with the lock-up region in a case that the battery is under the input/output limited state, during a time when the vehicle is driven at least by the internal combustion engine.

2. The vehicle control apparatus as set forth in claim 1, wherein the lock-up region is expanded to be wider as an input/output limitation of the battery becomes larger in the case that the battery is not under the input/output limited state, when the vehicle is driven at least by the internal combustion engine.

3. The vehicle control apparatus as set forth in claim 1, wherein the lock-up region is minimized in the case that the battery is under the input/output limited state, when the vehicle is driven at least by the internal combustion engine.

4. The vehicle control apparatus as set forth in claim 1, wherein the lock-up clutch has a slipping amount that can be decreased as a residual electric power in the battery is decreased, when the vehicle is driven only by the electric motor.

5. The vehicle control apparatus as set forth in claim 4, wherein the lock-up region is maximized when the residual electric power in the battery is less than a predetermined threshold value and the vehicle is driven only by the electric motor.

6. The vehicle control apparatus as set forth in claim 1, wherein the vehicle control apparatus further comprises an accelerator pedal that sets an acceleration demand of a driver for at least one of the internal combustion engine and the electric motor, and the lock-up region is determined based on a vehicle speed and an opening degree of the accelerator pedal.

7. The vehicle control apparatus as set forth in claim 6, wherein the vehicle is set to a lower vehicle speed in a case that the lock-up region is expanded.

8. The vehicle control apparatus as set forth in claim 1, further comprising a clutch disposed between the internal combustion engine and the electric motor, the clutch switching a transmission state between a disconnected state where the internal combustion engine and the electric motor are disconnected from each other and a connected state where the internal combustion engine and the electric motor are connected with each other, and the clutch is set to the disconnected state when the lock-up clutch is under the engaging state for regenerating electric power by the electric motor.

9. The vehicle control apparatus as set forth in claim 1, wherein (i) the electric motor rotates integrally with the driving wheels in the engaging state, and (ii) the electric motor rotates independently of, or with slip, with respect to the driving wheels in the disengaging state.

* * * * *